Dec. 30, 1947.  W. J. GEIST  2,433,691
SEAMING MACHINE
Filed July 17, 1943  2 Sheets-Sheet 1

Inventor
William J. Geist
By Mason, Porter & Diller
Attorneys

Dec. 30, 1947. W. J. GEIST 2,433,691
SEAMING MACHINE
Filed July 17, 1943 2 Sheets-Sheet 2
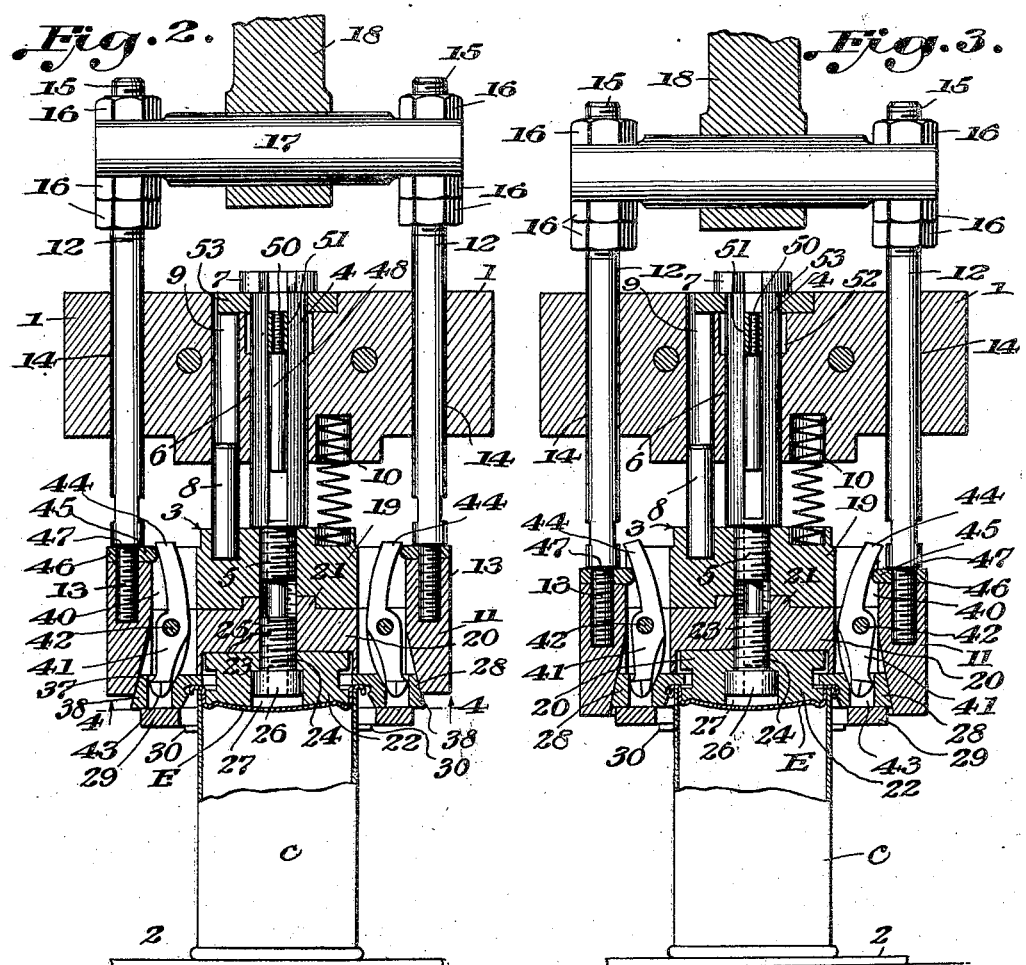
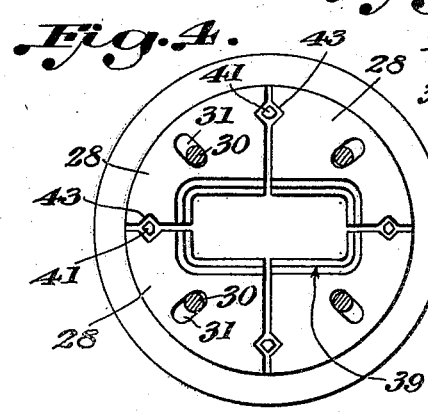
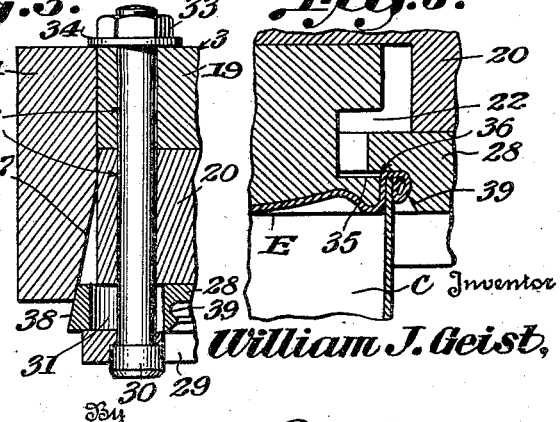
Inventor
William J. Geist,
By Mason, Porter & Diller
attys Patented Dec. 30, 1947

2,433,691

UNITED STATES PATENT OFFICE 2,433,691

SEAMING MACHINE

William John Geist, Richmond Heights, Mo., assignor to Continental Can Company, Inc., New York, N. Y., a corporation of New York Application July 17, 1943, Serial No. 495,201

6 Claims. (Cl. 113—18)

This invention relates to seaming machines and more particularly to machines for seaming heads or ends on containers.

This application is a continuation-in-part of the co-pending application of William J. Geist, Serial No. 379,335, filed February 17, 1941, Patent No. 2,324,501, for Seaming machine. The machine disclosed and claimed in the parent application includes an anvil-equipped chuck movable into and out of engagement with an end or closure arranged on a container in readiness for the formation of a seam, dies mounted on the chuck for shifting toward and from the closure or end, and a cam telescopically related to the chuck for movement relatively to the end for actuating the dies into seaming engagement with the end. Parts on the chuck and cam initially engage each other for supporting the chuck spaced from the container end but are adapted to become disengaged to allow die-actuating movement of the cam relative to the chuck when the chuck has come into engagement with the container end.

In the construction disclosed in the parent application, the cam referred to is single acting, that is, it acts only to move the dies from inactive position to active seam-forming position. When the cam is retracted it does not drive the dies away from seaming position, returning being effected by springs acting in opposition to the cam. It has been found that after very long periods of use the repeated flexing of the die returning springs sometimes results in breakage.

One object of the invention is to provide a seaming machine generally of the character referred to above and including positively driven means, such as a cam and follower mechanism for moving the seam-forming dies away from seaming position.

Another object of the invention is to provide novel and improved cam mechanism for operating the dies of seaming machines which may or may not also embody the aforementioned features of the construction disclosed in application Serial No. 379,335.

Another object of the invention is to provide seaming die operating mechanism of the kind referred to which includes a cam ring cooperable with die actuating rock levers mounted in slots in the chuck and being surrounded by the cam ring.

Other objects will become apparent from a reading of the following detail description, the appended claims, and the accompanying drawings.

In the drawings:

Figure 2 is a view similar to Figure 1 but drawn on a smaller scale and showing the parts in the positions occupied when the chuck and seaming dies have moved into engagement with the container end but prior to the seaming operation of the dies.

Figure 3 is a view similar to Figure 2 but showing the parts in seam forming positions.

Figure 4 is a section on the line 4—4 of Figure 2.

Figure 5 is a fragmentary vertical section showing bolts for holding chuck parts, dies, and a bottom ring assembled.

Figure 6 is a fragmentary detail view in vertical section showing a die and chuck anvil in seam forming engagement with a container and container end.

Figure 1:
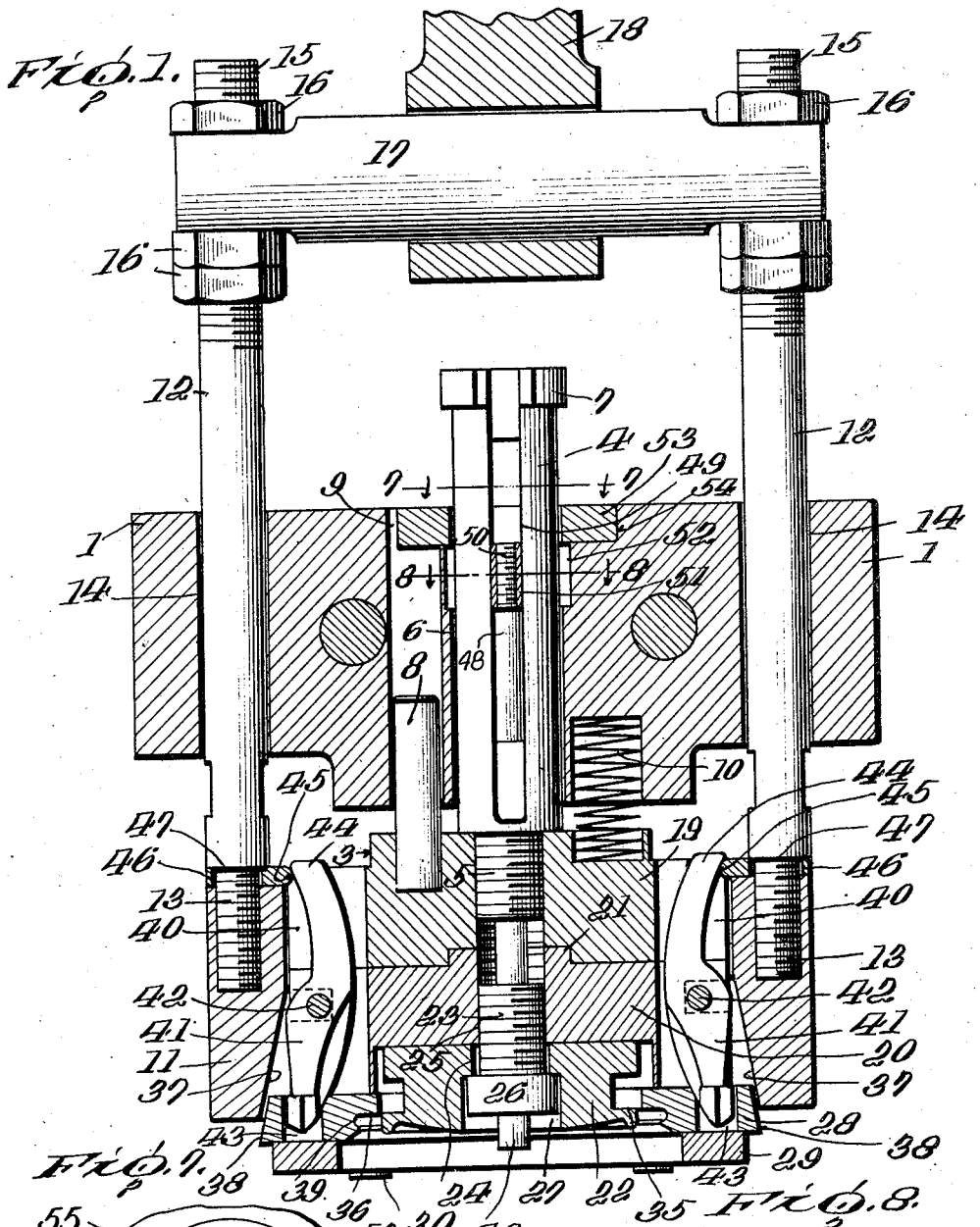
Figure 1 is a vertical sectional view of seaming machine mechanism embodying the invention, showing the parts at rest in the positions occupied before the chuck and seaming dies have been moved into engagement with a container end.
Figures 7, 8:
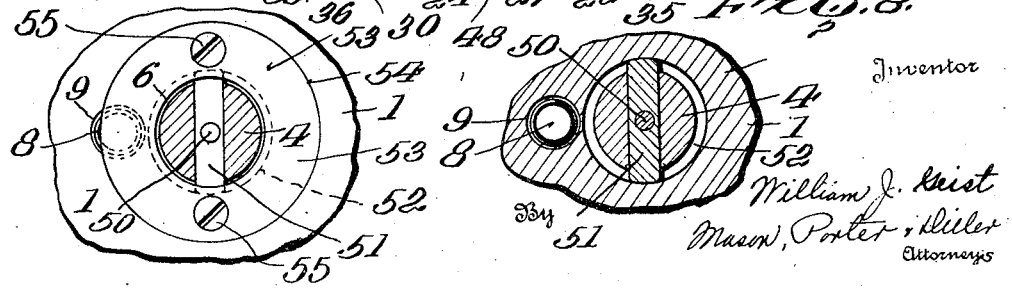
Figure 7 is a fragmentary horizontal section on the line 7—7 of Figure 1.
Figure 8 is a fragmentary horizontal section on the line 8—8 of Figure 1.

Mechanism embodying the invention in the illustrative form shown in the drawings may be mounted upon a stationary frame of which only a fixed guide part 1 and container support 2 are shown. The support 2 is adapted to carry a container C and closure or end E arranged thereon in readiness for the formation of a seam. A chuck generally designated 3 is mounted above the support 2 and is guided for reciprocatory movement by a shouldered stud or rod 4 having threaded connection at 5 with the chuck 3 and extending for sliding movements through an opening 6 in the fixed part 1. The upper end of the rod 4 is formed with a flange 7 engageable with the top of the part 1 for limiting downward movement of the chuck 3. Pins 8 secured to the chuck 3 are guided in openings 9 formed in the fixed part 1 for preventing rotation of the chuck about the axis of the rod 4. Springs 10 interposed between the part 1 and the chuck urge the latter downwardly.

A cam ring 11 telescopically related to and surrounding the chuck 3 is suspended by rods 12 having threaded connection with the cam ring at 13 and extending vertically through guide openings 14 in the fixed part 1. The upper ends of the rods 12 are threaded as at 15 and are secured by nuts 16 to a vertically reciprocable cross head 17. The cross head is operatively connected to a driving member 18 actuatable in any desired manner, for example by means of a toggle construction similar to that disclosed in the copending application (now patent 2,324,501) previously referred to. Parts respectively on the cam ring and the chuck to be described later are adapted to engage each other for lifting the chuck 3 when the cam ring 11 is raised and for maintaining the chuck 3 raised when the cam ring is in its normal lifted position. The arrangement is such that when the cam ring is lowered the chuck is left free to move downwardly by gravity assisted by the force exerted by the springs 10.

The chuck shown comprises upper and lower body sections 19 and 20 centralized with respect to each other by a boss 21 on the section 20 fitting into a depression or recess in the section 19. The chuck assembly also includes an anvil 22 carried below the bottom section 20 and having its lower face formed for engaging the container end E and holding it in shape when the seam is being formed. The anvil 22 is secured to the bottom body section 20 by a sleeve 23 extending through an opening 24 in the anvil and having threaded connection at 25 with the body section 20, a flange or head 26 on the sleeve engaging the root of a counterbore 27 in the anvil 22.

Four segmental dies 28 are positioned in sliding engagement with the bottom of the chuck section 20 for shifting movements inwardly toward and outwardly away from the anvil 22. The dies 28 are held snugly against the chuck section 20 by a bottom ring 29 disposed under the dies and connected to the chuck 3 by bolts 30 which extend through radially elongated openings 31 in the dies and through openings 32 in the chuck bodies 19 and 20 as shown in Figure 4. The upper ends of the bolts 30 are threaded to receive nuts 33 which bear against washers 34, the edges of which overlap the cam ring 11. The nuts 33 are drawn up sufficiently to maintain the chuck sections 19 and 20, the dies 28, and the ring 29 in snug assembly but are not drawn tightly enough to prevent free sliding of the dies 28 between the bottom chuck section 20 and the ring 29. The slots 31 are long enough radially to permit the necessary shifting of the dies 28 without interference by the bolts 30. The anvil 22 has a rim 35 which underlies ledges 36 on the dies 28.

When the cam ring 11 is in its elevated normal or inactive position as shown in Figure 1, its upper face lying under the overlapping portions of the washers 34 as shown in Figure 5 will support the chuck assembly together with the dies 28 and bottom ring 29. When the cam ring 11 is moved downwardly the chuck assembly will descend under the action of gravity and the springs 10 until the anvil 22 comes to rest in engagement with the end E as shown in Figure 2. Further downward movement of the chuck assembly will then be prevented by engagement of the flange 7 with the fixed part 1. Continued downward movement of the cam ring 11 is utilized for driving the dies 28 inwardly toward the anvil 22 and into seaming engagement with the end E. To this end the lower portion of the cam ring 11 is formed with a seaming cam surface 37 facing inwardly toward the chuck for cooperation with follower surfaces 38 formed on the outer edges of the dies 28. When the cam ring 11 moves downwardly with respect to the chuck from the position shown in Figure 2, the cam surfaces 37 and 38 will cooperate to drive the dies 28 into the seaming position shown in Figure 3. The dies are formed with seaming portions having a suitable contour as shown at 39 (see Figures 1, 4 and 5). It will be understood, however, that the die seaming surfaces may vary in accordance with the type of container end employed and the kind of seam to be formed.

In accordance with the invention, mechanism is provided for positively driving the dies 28 outwardly away from the anvil 22 and end E for the formation of the seam. In the form shown the chuck body members 19 and 20 are formed with slots 40 one adjacent and above each die segment 28 where it adjoins an adjacent segment. Mounted in each slot 40 is a rock lever 41 pivoted on the chuck body section 20 as at 42. The bottom ends of the lever 41 extend into openings 43 in the associated die segments 28. The top end of each lever 41 is formed as a follower 44 engageable by a resetting cam surface 45 on the cam ring 11. In the illustrative embodiment, the surface 45 is formed on a separate ring section 46 clamped on top of the main ring 11 by shoulders 47 on the rods 12.

In operation, when the cam ring 11 is raised following the formation of a seam, the resetting cam surface 45 will co-act with the upper ends 44 of the rock levers 41 to swing the lever upper ends inwardly and thereby move the lower ends of the levers outwardly or away from the anvil, thus retracting the dies 28.

After the dies have been retracted in this manner and the cam ring 11 has been moved further upwardly, it will engage the washers 34 so as to lift the chuck 3 above to the position shown in Figure 1.

Means are provided for forcibly ejecting from the chuck any end seamed container which may have stuck to the anvil when the chuck is raised to its Figure 1 position. A knockout or ejector pin 48 extending through the sleeve 23 projects upwardly through a bore in the threaded part 5 of the rod 4 and into a transverse slot 49 formed in the rod 4. The upper end of the pin 48 is threaded as at 50 for connection to a cross piece 51 extending through the slot 49 and with its ends projecting into a counterbore 52 in the fixed frame part 1. The cross piece 51 is locked in the counterbore 52 by a retaining ring 53 held in a seat 54 by screws 55. The arrangement is such that regardless of the position of the transverse slot 49 when the shouldered stud or rod 4 has been screwed home in the chuck 3, the cross piece 51 may be locked in the counterbore 52 and the ejector rod thus secured to the fixed part 1.

In operation, if a seamed container should be carried up with the chuck when the latter is moved upwardly from its Figure 3 position, the lower end of the pin 48 will be projected below the bottom of the anvil 22, as shown in Figure 1, so as to be engaged by the end E. Consequently the pin 48 will hold the end E against further upward movement and the seamed container and end will be stripped from the chuck when the chuck continues to rise.

The mechanism disclosed herein embodies the invention in the form now preferred but it will be apparent that changes may be made without departing from the invention as defined in the claims.

I claim:

1. In a machine for seaming ends on containers, a support for a container which has an end arranged thereon, a chuck relatively movable into and out of engagement with said end, segmental dies shiftably carried by said chuck for bodily movement inwardly toward and outwardly away from said end when it is engaged by said chuck, an axially reciprocable cam ring surrounding said chuck and having a seaming cam surface facing inwardly and engaging said dies for shifting said dies inwardly toward said end when said cam ring is moved in one axial direction, rock levers pivoted on said chuck and being operatively connected to said dies respectively, said cam ring having a resetting cam surface engageable with said rock levers for actuating the latter to retract said dies from seaming position when said cam ring is moved axially in the opposite direction, and means for moving said cam ring successively in said axial directions.

2. In a machine for seaming ends on containers, an element for supporting a container which has an end thereon, a chuck element, means mounting one of said elements for movement relatively to the other of said elements for effecting engagement of said chuck element with said end, dies mounted on said chuck element for movement inwardly toward and outwardly away from said chuck element engaged end, a cam ring surrounding said chuck and being mounted to move along the line of relative movement between said elements and having a seaming cam surface facing inwardly and operatively engaging said dies for moving said dies inwardly toward the chuck element engaged end when said cam ring is moved in one direction along said line and having also a resetting cam surface, slots in said chuck element, one adjacent each die, resetting cam follower levers in said slots respectively and being pivoted on said chuck element intermediate their ends, one end of each of said levers being connected to an associated die and the other end of each lever being cooperable with said resetting cam for moving the associated dies outwardly away from the chuck element engaged end when said cam ring is moved in the opposite direction along said line, and means for effecting relative movement between said chuck element and said supporting element and for moving said cam ring in said directions.

3. In a machine for seaming an end on a container, the end having a raised seam, the combination of a chuck movable between a retracted position and a position at the container end, an anvil on the chuck adapted to fit within the seam when the chuck is in the position at the container, a set of dies supported at the lower end of the chuck for individual movement toward the seam, a cam ring telescopically encircling the chuck and having a continuous flared camming surface disposed to cooperate with the dies in the horizontal plane occupied by the anvil to force the dies inwardly when the ring is moved downwardly relative to the chuck, and means actuated by said ring upon upward movement thereof relative to the chuck for positively moving the dies outwardly.

4. In a machine for seaming an end on a container, the end having a raised seam, the combination of a chuck movable between a retracted position and a position at the container end, an anvil on the chuck adapted to fit within the seam when the chuck is in the position at the container, a set of dies supported at the lower end of the chuck for individual movement toward the seam, a cam ring telescopically encircling the chuck and having a continuous flared camming surface disposed to cooperate with the dies in the horizontal plane occupied by the anvil to force the dies inwardly when the ring is moved downwardly relative to the chuck, said chuck having a plurality of radially disposed slots therein, levers uprightly disposed in said slots and pivotally supported intermediately of their ends, said dies having recesses formed therein in which the lower ends of the levers engage, and cam means carried by the ring and engageable with the upper ends of the levers upon upward movement of the ring relative to the chuck for positively moving the dies outwardly.

5. In a machine for seaming an end on a container, the end having a raised seam, the combination of a chuck movable between a retracted position and a position at the container end, an anvil on the chuck adapted to fit within the seam when the chuck is in the position at the container, a set of dies supported at the lower end of the chuck for individual movement toward the seam, a cam ring telescopically encircling the chuck and having a continuous flared camming surface disposed to cooperate with the dies in the horizontal plane occupied by the anvil to force the dies inwardly when the ring is moved downwardly relative to the chuck, said chuck having a plurality of radially disposed slots therein, levers uprightly disposed in said slots and pivotally supported intermediately of their ends, said dies having recesses formed therein in which the lower ends of the levers engage, and cam means carried by the ring and engageable with the upper ends of the levers upon upward movement of the ring relative to the chuck for positively moving the dies outwardly, each said die having two angularly related active faces for cooperating with two angularly related parts of the seam which join at a corner of the seam, and adjacent edge portions of the dies being disposed to lie in proximity when the dies are pressed against the seam, and said lever end receiving recesses being compositely formed in said adjacent die edge portions.

6. In a machine for seaming an end on a container, the end having a raised seam, the combination of a chuck movable between a retracted position and a position at the container end, an anvil on the chuck adapted to fit within the seam when the chuck is in the position at the container, a set of dies supported at the lower end of the chuck for individual movement toward the seam, a cam ring telescopically encircling the chuck and having a continuous flared camming surface disposed to cooperate with the dies in the horizontal plane occupied by the anvil to force the dies inwardly when the ring is moved downwardly relative to the chuck, said chuck having a plurality of radially disposed slots therein, levers uprightly disposed in said slots and pivotally supported intermediately of their ends, said dies having recesses formed therein in which the lower ends of the levers engage, and cam means carried by the ring and engageable with the upper ends of the levers upon upward movement of the ring relative to the chuck for positively moving the dies outwardly, each said die having two angularly related active faces for cooperating with two angularly related parts of the seam which join at a corner of the seam, and adjacent edge portions of the dies being disposed to lie in proximity when the dies are pressed against the seam, and said lever end receiving recesses being compositely formed in said adjacent die edge portions and shaped to cooperate with said lower lever ends in causing each die to move outwardly in the direction of projection of the jointure of its two angularly related active faces.

WILLIAM JOHN GEIST.

REFERENCES CITED

The following references are of record in the file of this patent:

UNITED STATES PATENTS

| Number | Name | Date |
|---|---|---|
| 398,229 | Chambers | Feb. 19, 1889 |
| 950,017 | Eldridge | Feb. 22, 1910 |
| 1,010,617 | Gray | Dec. 5, 1911 |
| 1,193,463 | Januchowsky | Aug. 1, 1916 |
| 1,567,074 | Mudd | Dec. 29, 1925 |
| 2,216,433 | Conner | Oct. 1, 1940 |
| 2,324,501 | Geist | July 20, 1943 |
| 2,325,160 | Goodwin | July 27, 1943 |